(12) United States Patent
Nagayama et al.

(10) Patent No.: US 8,424,663 B2
(45) Date of Patent: Apr. 23, 2013

(54) TORQUE LIMITER

(75) Inventors: Akihide Nagayama, Kashiba (JP);
Takeshi Miyachi, Yao (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 86 days.

(21) Appl. No.: 12/735,601

(22) PCT Filed: Jan. 30, 2009

(86) PCT No.: PCT/JP2009/051569
§ 371 (c)(1),
(2), (4) Date: Jul. 30, 2010

(87) PCT Pub. No.: WO2009/096517
PCT Pub. Date: Aug. 6, 2009

(65) Prior Publication Data
US 2011/0002729 A1    Jan. 6, 2011

(30) Foreign Application Priority Data

Jan. 31, 2008 (JP) ................................ P2008-020902

(51) Int. Cl.
*F16D 43/286* (2006.01)
(52) U.S. Cl.
USPC ........................................ 192/85.13; 464/30
(58) Field of Classification Search ................. 192/56.3, 192/85.12, 85.13; 403/5, 31; 464/30
See application file for complete search history.

(56) References Cited

U.S. PATENT DOCUMENTS

| 2,637,345 | A | * | 5/1953 | Kraft ..................... 192/85.13 X |
| 4,264,229 | A | | 4/1981 | Falk et al. |
| 5,051,018 | A | | 9/1991 | Appell et al. |
| 5,366,055 | A | * | 11/1994 | Pudelski et al. ........... 192/85.12 |
| 2009/0173591 | A1 | | 7/2009 | Ootsuka et al. |
| 2010/0184519 | A1 | | 7/2010 | Ootsuka et al. |

FOREIGN PATENT DOCUMENTS

| JP | 55-10191 | 1/1980 |
| JP | 58-135526 | 9/1983 |
| JP | 63-130924 | 6/1988 |
| JP | 3-129124 | 6/1991 |
| JP | 7-310753 | 11/1995 |
| WO | WO 2007/114210 (A1) | 10/2007 |

OTHER PUBLICATIONS

Notification of Reasons for Refusal dated Nov. 2, 2012, with English translation.

* cited by examiner

*Primary Examiner* — Gregory Binda
(74) *Attorney, Agent, or Firm* — McGinn IP Law Group, PLLC

(57) ABSTRACT

A torque limiter in which an area of a region where an inner face of a circumferentially extending chamber intersects an oil pressure expanding chamber in an extended plane extended toward the oil pressure expanding chamber is larger than a sectional area of an opening of an oil removing hole which is opened to the circumferentially extending chamber.

13 Claims, 5 Drawing Sheets

TORQUE LIMITER

TECHNICAL FIELD

The present invention relates to a torque limiter.

BACKGROUND ART

Conventionally, there has been such a torque limiter as disclosed in Japanese Patent Publication No. JP-A-07-310753 (Patent Document 1).

This torque limiter is so constructed that an inner peripheral face of a tube member is fitted over an outer peripheral face of a shaft member, and by supplying pressurized oil to an oil pressure expanding chamber of the tube member, the inner peripheral face of the tube member is reduced in diameter by the pressurized oil in the oil pressure expanding chamber, and pressed against the outer peripheral face of the tube member. In this manner, the shaft member is frictionally coupled to the tube member thereby to transmit a torque. Then, the pressurized oil in the oil pressure expanding chamber is sealed with a shear tube, and a locking member locked to an end part of the shear tube is fixed to the shaft member.

When a rotary position of the shaft member with respect to the tube member is changed, because a load more than a determined value has been exerted on the shaft member or the tube member, and the inner peripheral face of the tube member has slipped with respect to the outer peripheral face of the shaft member, the end part of the shear tube is cut by the locking member, and the pressurized oil in the oil pressure expanding chamber is discharged to the exterior, through an oil removing hole which is formed in the shear tube. As the results, the inner peripheral face of the tube member becomes unable to be pressed against the outer peripheral face of the shaft member, and the frictional coupling between the shaft member and the tube member is released, thereby to interrupt transmission of the torque. Moreover, lubricating oil is applied between the shaft member and the tube member, for the purpose of preventing burn-outs of the shaft member and the tube member, which occurs when a load more than the determined value has been exerted on the shaft member or the tube member, and the inner peripheral face of the tube member is sliding with respect to the outer peripheral face of the shaft member.

In the above described conventional torque limiter, when a load more than the determined value has been exerted on the shaft member or the tube member, and the inner peripheral face of the tube member has slipped with respect to the outer peripheral face of the shaft member, the oil in the oil pressure expanding chamber must be rapidly removed. Otherwise, dynamic friction force is exerted on respective frictionally engaged faces of the shaft member and the tube member for a long time, and burn-outs are likely to occur on the frictionally engaged faces of the shaft member and the tube member.

For this reason, in the conventional or existing torque limiter, it is desired to remove the oil from the oil pressure expanding chamber more rapidly, thereby to shorten the time that the dynamic friction force is exerted on the shaft member and the tube member, when a load more than the determined value has been exerted on the shaft member or the tube member, and the inner peripheral face of the tube member has slipped with respect to the outer peripheral face of the shaft member.

Patent Document 1: Japanese Patent Publication No. JP-A-7-310753

DISCLOSURE OF THE INVENTION

Problems that the Invention is to Solve

In view of the above, it is an object of the invention to provide a torque limiter in which oil in an oil pressure expanding chamber can be rapidly removed, when an inner peripheral face of a tube member has slipped with respect to an outer peripheral face of a shaft member, and burn-outs are unlikely to occur on respective frictionally engaged faces of the shaft member and the tube member.

Means for Solving the Problems

In order to solve the above described problem, there is provided, according to the invention, a torque limiter comprising
  a shaft member,
  a tube member which is rotatably fitted over the shaft member,
    the tube member including
    an oil pressure expanding chamber for pressing an inner peripheral face of the tube member against an outer peripheral face of the shaft member,
    a circumferentially extending chamber communicated with the oil pressure expanding chamber, projected outward from the oil pressure expanding chamber in a radial direction of the tube member, and extending in a circumferential direction of the tube member, and
    an oil removing hole opened to the circumferentially extending chamber, and having a radially extending part which is extended outward in the radial direction from the circumferentially extending chamber,
    the oil removing hole is so constructed that when a load less than a determined value is exerted on the shaft member or the tube member, an end of the oil removing hole at an opposite side to the circumferentially extending chamber is sealed, whereby the oil pressure expanding chamber is inflated with the oil which is sealed in the oil pressure expanding chamber thereby to frictionally engage the shaft member and the tube member with each other, and when a load more than the determined value is exerted on the shaft member or the tube member, the end of the oil removing hole at the opposite side to the circumferentially extending chamber is opened to the exterior, whereby the oil in the oil pressure expanding chamber is removed thereby to release the frictional engagement between the shaft member and the tube member,
    characterized in that while the oil pressure expanding chamber is inflated, an area of a region where an inner face of the circumferentially extending chamber intersects the oil pressure expanding chamber in an extended plane extended toward the oil pressure expanding chamber is larger than a sectional area of an opening of the oil removing hole which is opened to the circumferentially extending chamber.

Moreover, according to the invention, there is provided a torque limiter comprising
  a shaft member,
  a tube member which is rotatably fitted over the shaft member,
    the shaft member including
    an oil pressure expanding chamber for pressing an outer peripheral face of the shaft member against an inner peripheral face of the tube member,
    a circumferentially extending chamber communicated with the oil pressure expanding chamber, projected inward from the oil pressure expanding chamber in a radial direction of the tube member, and extending in a circumferential direction of the tube member, and an oil removing hole opened to the circumferentially extending chamber, and having a radially extending part which is extended inward in the radial direction from the circumferentially extending chamber, the oil removing hole is so constructed that when a load less than a determined value is exerted on the shaft member or the tube member, an end of the oil removing hole at an opposite side to the circumferentially extending chamber is sealed, whereby the oil pressure expanding chamber is inflated with the oil which is sealed in the oil pressure expanding chamber thereby to frictionally engage the shaft member and the tube member with each other, and when a load more than the determined value is exerted on the shaft member or the tube member, the end of the oil removing hole at the opposite side to the circumferentially extending chamber is opened to the exterior, whereby the oil in the oil pressure expanding chamber is removed thereby to release the frictional engagement between the shaft member and the tube member, characterized in that while the oil pressure expanding chamber is inflated, an area of a region where an inner face of the circumferentially extending chamber intersects the oil pressure expanding chamber in an extended plane extended toward the oil pressure expanding chamber is larger than a sectional area of an opening of the oil removing hole which is opened to the circumferentially extending chamber.

It is to be noted that the above described extended plane is defined as a strip-shaped plane which is defined as an excursion drawn by a closed curve, which is a part of the inner face in contact with the oil pressure expanding chamber, when the closed curve is moved in the radial direction.

The inventor has conducted a number of tests, with trial and error, on the structure for rapidly removing the oil in the oil pressure expanding chamber, when the inner peripheral face of the tube member has slipped with respect to the outer peripheral face of the shaft member, using the torque limiters of various structures, and carried out thorough researches. As the results, it was found that in the conventional structure of the torque limiter, there is a limit in reducing the time for removing the oil in the oil pressure expanding chamber, only by increasing the number of the oil removing holes or by making a diameter of the oil removing hole larger, and the time for removing the oil in the oil pressure expanding chamber cannot be remarkably shortened.

It was also found that in case where the circumferentially extending chamber which is extended in the circumferential direction is formed between the oil pressure expanding chamber and the oil removing hole, and the area of the region where the inner face of the circumferentially extending chamber intersects the oil pressure expanding chamber in the extended plane extended toward the oil pressure expanding chamber is made larger than the sectional area of the opening of the oil removing hole which is opened to the circumferentially extending chamber, the oil in the oil pressure expanding chamber can be removed rapidly by about four times, as compared with the conventional structure, and the time for removing the oil can be abruptly shortened.

It is presumed that this is because in the conventional torque limiter, the oil pressure expanding chamber has a very small thickness in the radial direction, and when the frictional engagement is released, an access of the oil to the oil removing hole is limited, even though the oil removing hole is increased in number or in diameter, and it is difficult for the oil to enter into the oil removing hole.

The reason why the time required for removing the oil can be remarkably shortened, by forming the circumferentially extending chamber having the above described structure, is as follows. The oil which has passed the region where the inner face of the circumferentially extending chamber intersects the oil pressure expanding chamber in the extended plane extended toward the oil pressure expanding chamber has an easy access to the circumferentially extending chamber, and the oil can remarkably easily arrive (access) at the oil removing hole, because the area of the region intersecting the oil pressure expanding chamber is large.

According to the invention, the area of the region where the inner face of the circumferentially extending chamber intersects the oil pressure expanding chamber in the extended plane extended toward the oil pressure expanding chamber is made larger than the sectional area of the opening of the oil removing hole which is opened to the circumferentially extending chamber. Therefore, it is possible to remove the oil from the oil pressure expanding chamber more rapidly, when the load more than the determined value has been exerted on the shaft member or the tube member, and the inner peripheral face of the tube member has slipped with respect to the outer peripheral face of the shaft member, and the time that the dynamic friction power is exerted between the shaft member and the tube member can be remarkably shortened. As the results, burn-outs on the respective frictionally engaged faces of the shaft member and the tube member can be restrained.

Moreover, in one embodiment of the invention, the circumferentially extending chamber is a chamber in an annular shape.

According to the above described embodiment, because the circumferentially extending chamber is the chamber in an annular shape, it is possible to increase the area of the region where the inner face of the circumferentially extending chamber intersects the oil pressure expanding chamber in the extended plane extended toward the oil pressure expanding chamber. Therefore, as compared with the conventional structure, it is possible to abruptly rapidly remove the oil from the oil pressure expanding chamber, when the inner peripheral face of the tube member has slipped with respect to the outer peripheral face of the shaft member.

Further, in another embodiment of the invention, a length of the circumferentially extending chamber in the axial direction of the shaft member is larger than a diameter of the oil removing hole.

In the above described embodiment, because the length of the circumferentially extending chamber in the axial direction of the shaft member is larger than the diameter of the oil removing hole, it is possible to more rapidly remove the oil from the oil pressure expanding chamber, as compared with the conventional structure, when the inner peripheral face of the tube member has slipped with respect to the outer peripheral face of the shaft member.

Advantage of the Invention

According to the torque limiter of the invention, when a load more than the determined value has been exerted on the shaft member or the tube member, and the inner peripheral face of the tube member has slipped with respect to the outer peripheral face of the shaft member, the oil in the oil pressure expanding chamber can be more rapidly removed, and the time that the dynamic friction force is exerted between the shaft member and the tube member can be shortened. Therefore, it is possible to restrain occurrence of burn-outs on respective frictionally engaged faces of the shaft member and the tube member.

BEST MODE FOR CARRYING OUT THE INVENTION

Figure 1:
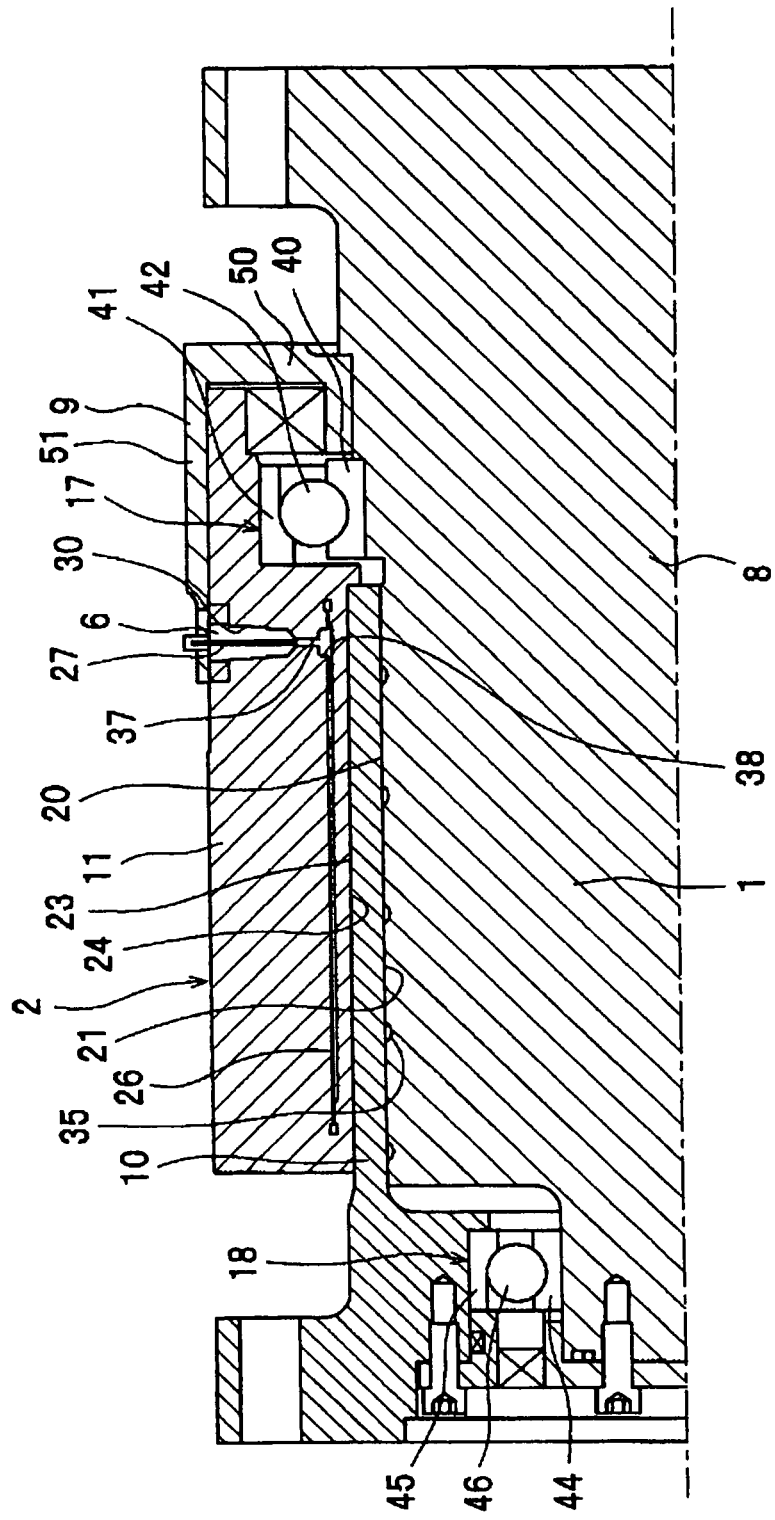
FIG. 1 is a sectional view of a torque limiter in a first embodiment according to the invention, taken along an axial direction.

Now, the invention will be more fully described, referring to the embodiments as shown in the drawings.

FIG. 1 is a sectional view of a torque limiter in a first embodiment according to the invention, taken along an axial direction.

This torque limiter includes a shaft member 1, a tube member 2, a shear valve 6, a ball bearing 17, and a ball bearing 18.

The shaft member 1 includes a body part 8 having an outer peripheral face 20 in a substantially cylindrical shape, and a locking part 9 in a substantially L-shape projecting from an outer face of the body part 8. The outer peripheral face 20 of the shaft member 1 has an oil seal preventing groove 35 in a spiral shape. This groove 35 in the spiral shape is open to both sides of the shaft member 1 in the axial direction. Moreover, a pitch of the grooves 35 in the spiral shape is more than 1/10 and less than 1/5 of a shaft diameter (an outer diameter) of the shaft member 1. This groove 35 has a function of discharging superfluous lubricating oil (traction oil which will be described below) to the exterior through the openings of the groove 35, when the power is transmitted. In other words, the groove 35 discharges the superfluous lubricating oil, when the power is transmitted, thereby to prevent a remarkable drop of release torque from a determined value, and to set the release torque substantially at a designed value.

The tube member 2 is composed of a first tube member 10 and a second tube member 11. The first tube member 10 has an inner peripheral face 21 in a substantially cylindrical shape which is brought into contact with the outer peripheral face 20 of the shaft member 1. Traction oil which is the lubricating oil for preventing a burn-out is applied between the outer peripheral face 20 of the shaft member 1 and the inner peripheral face 21 of the tube member 2. The groove 35 of the shaft member 1 in the spiral shape is open to both ends in the axial direction of a region where the outer peripheral face 20 of the shaft member 1 is in contact with the inner peripheral face 21 of the tube member 2.

This traction oil is synthetic oil of naphthalene group or mineral oil of naphthene group having a functional group of alicyclic family such as cyclopenthyl group, cyclohexyl group, cycloheptyl group, a functional group a part of which is unsaturated, a functional group in which carbon atom in a part of the aforesaid functional group is substituted with oxygen atom, sulfur atom or nitrogen atom, a functional group formed by cross-linking these functional groups, a functional group having a condensed ring by condensing these functional groups, or polycyclic functional group of aromatic family formed by using these functional groups. As other examples of the traction oil, there are branched type alkylbenzene, alkylnaphthalene, or polyorganosiloxane containing phenyl group or cyclohexyl group. As further examples of the traction oil, there are α-alkylstylene dimmer, hydride of α-alkylstylene dimmer, perfluoropolyether represented by a structural formula $F—(CF(CF_3)CF_2O)n-C_2F_5$, and a derivative of this perfluoropolyether.

Moreover, it is possible to mix this traction oil with paraffin-based mineral oil, hydrogen carbide based synthetic oil such as poly-α-olefin oil, ester oil such as diester or polyolester, or known lubricating oil such as polyalkylglycol oil, alkyldiphenylether oil, silicone oil, perfuluoroalkylpolyether oil, and so on.

For the purpose of further enhancing practicability, an adequate amount of additives such as antioxidant, antirust, cleansing and dispersing agent, pour point depressant, viscosity index enhancing agent, extreme-pressure agent, abrasion resistance additive, anticorrosive agent, antifoaming agent, metal deactivating agent, coloring agent, etc. may be added.

It would be preferable that the traction oil has a large pressure viscosity index. For the present use, 18 $GPa^{-1}$ (40° C.) or more is preferable, 25 $GPa^{-1}$ (40° C.) or more is further preferable, and 32 $GPa^{-1}$ (40° C.) or more is still further preferable. Such traction oil as described above is easily vitrified by contact face pressure between a shaft and a sleeve, and can easily transmit a driving force. Moreover, with this traction oil, direct contact between the shaft and the sleeve is decreased, and sticking of the shaft to the sleeve is prevented, whereby torque can be easily released, when pressure of the oil in an oil pressure chamber has dropped and the oil has been liquidized.

The second tube member 11 has an inner peripheral face 24 in a substantially cylindrical shape which is contacted with an outer peripheral face 23 of the first tube member 10 in a substantially cylindrical shape. Moreover, the second tube member 11 has a shear valve fitting hole 30, and an oil pressure expanding chamber 26 in a substantially tubular shape which is extended in a substantially axial direction of the shaft member 1 along a determined length in the axial direction of the inner peripheral face 24 of the second tube member 11.

The shear valve 6 is fitted into the shear valve fitting hole 30. In a state where the shear valve 6 is fitted into the shear valve fitting hole 30, one end portion of the shear valve 6 is projected outward in the radial direction than an outer peripheral face of the second tube member 11. The locking part 9 in a substantially L-shape in section has a radially extending part 50 which is extended in a substantially radial direction and opposed to an end face of the second tube member 11 in the axial direction, and an axially extending part 51 which is continued from this radially extending part 50 and extended in the axial direction along the outer peripheral face of the second tube member 11. The one end portion of the shear valve 6 is locked by the axially extending part 51 of the locking part 9.

Moreover, the shear valve 6 has a tube 27 which is open only at its one end. In the state where the shear valve 6 is fitted into the shear valve fitting hole 30, this tube 27 is extended in a substantially radial direction of the shaft member 1. Also in the state where the shear valve 6 is fitted into the shear valve fitting hole 30, one end of the tube 27 at a closed side is projected outward in the radial direction from the outer peripheral face of the second tube member 11. An opening of the tube 27 at the opposite side to the closed side is communicated with one end of the oil pressure expanding chamber 26 in the axial direction, by way of an oil passage 37 and a circumferentially extending chamber 38. The tube 27 and the oil passage 37 constitute an oil removing hole, in which the oil passage 37 forms a radially extending part of the oil removing hole. The oil pressure expanding chamber 26 has a tight-sealed space at a side close to the shear valve 6.

The ball bearing 17 includes an inner ring 40 which is inserted and fixed over the outer face of the shaft member 1, an outer ring 41 which is inserted and fixed into an inner face of the second tube member 11, and a ball 42 which is disposed between a raceway face of the inner ring 40 and a raceway face of the outer ring 41. Moreover, the ball bearing 18 includes an inner ring 44 which is inserted and fixed over the outer face of the shaft member 1, an outer ring 45 which is inserted and fixed into an inner face of the first tube member 10, and a ball 46 which is disposed between a raceway face of the inner ring 44 and a raceway face of the outer ring 45. The ball bearings 17 and 18 support the shaft member 1 so as to rotate with respect to the tube member 2, when the shaft member 1 is rotated relative to the tube member 2.

Figure 2:
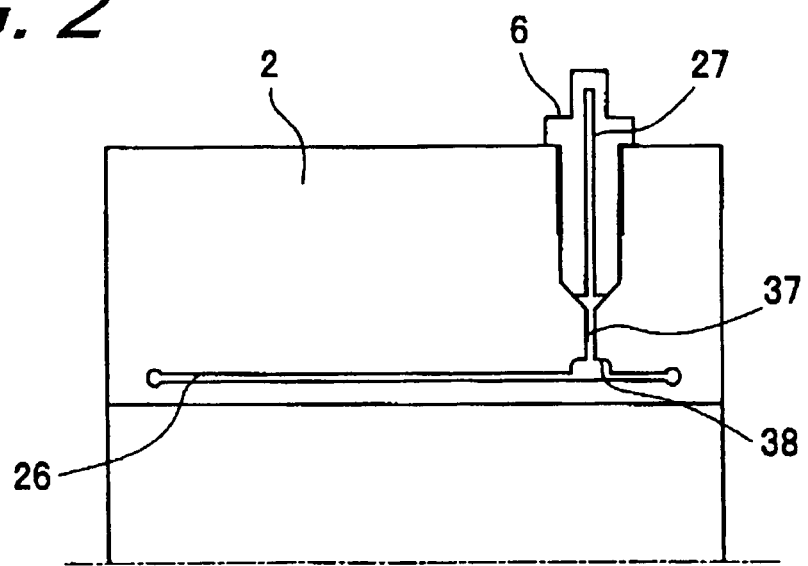
FIG. 2 is an enlarged view schematically showing relation of connection between a shear valve, an oil removing hole, a circumferentially extending chamber, and an oil pressure expanding chamber.
Figure 3:
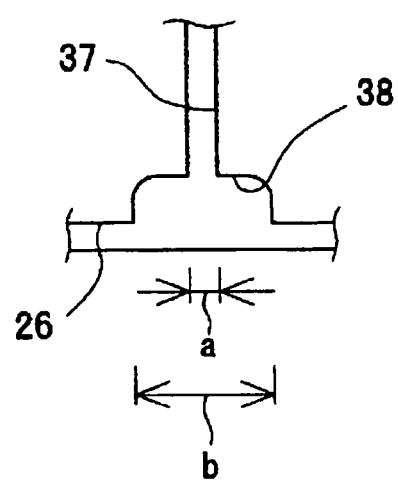
FIG. 3 is an enlarged view schematically showing a region surrounding the circumferentially extending chamber.

FIG. 2 is an enlarged view schematically showing relation of connection between the shear valve 6, the oil removing hole (composed of the tube 27 and the oil passage 37), the circumferentially extending chamber 38, and the oil pressure expanding chamber 26. FIG. 3 is an enlarged view schematically showing a region surrounding the circumferentially extending chamber 38.

As shown in FIGS. 2 and 3, the oil passage 37, as a radially extending part of the oil removing hole, is extended in the radial direction of the tube member 2. Moreover, the circumferentially extending chamber 38 is open to the oil pressure expanding chamber 26 to be communicated with the oil pressure expanding chamber 26. The circumferentially extending chamber 38 has a substantially rectangular shape in section in the axial direction, and is extended in an arc-like shape in section perpendicular to the axial direction. Although not shown in the drawings, a sectional area of the circumferentially extending chamber 38, taken along a plane perpendicular to an extending direction of the oil passage 37 as the radially extending part, is larger than a sectional area of the oil passage 37, irrespective of a distance between the plane and a center axis of the shaft member 1.

Figure 4:
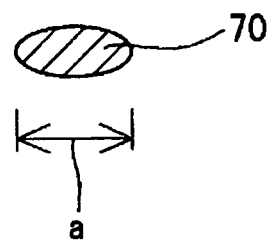
FIG. 4 is a sectional view showing an opening of the oil removing hole which is opened to the circumferentially extending chamber and defined by a part of a cylindrical face.
Figure 5:
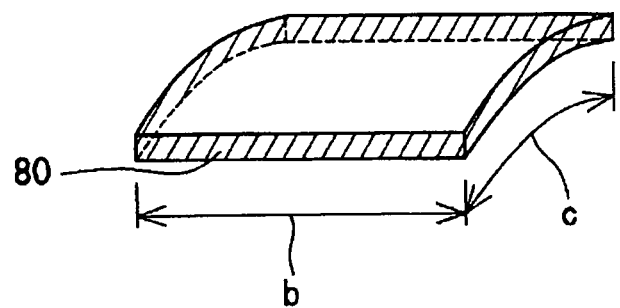
FIG. 5 is a view showing a region where an inner face of the circumferentially extending chamber intersects the oil pressure expanding chamber in an extended plane extended toward the oil pressure expanding chamber.

The oil passage 37 is a passage having a round shape in section. As shown in FIG. 4, a diameter of the oil passage 37 in section is a(cm), while a size in the axial direction of the circumferentially extending chamber 38 is b(cm), as shown in FIG. 5, which is a fixed value larger than the diameter a(cm) of the oil passage 37, irrespective of a position of the circumferentially extending chamber 38 in the circumferential direction.

Although not shown, the circumferentially extending chamber 38 (precisely speaking, the innermost part of the circumferentially extending chamber 38 in the radial direction) is extended in the circumferential direction along a length of a fixed value c(cm) which is larger than the diameter a(cm) of the oil passage 37. The oil passage 37 is open to a next part, that is, a part of an inner face of the circumferentially extending chamber 38 positioned outward in the radial direction, and a part positioned at a substantially center in the axial direction, and a part positioned at a substantially center in the circumferential direction.

A hatched region 70 in FIG. 4 shows a sectional plane of an opening of the oil passage 37, which is a part of the oil removing hole, opened to the circumferentially extending chamber 38, and defined by a part of a cylindrical face.

When the oil pressure expanding oil is filled into the oil pressure expanding chamber 26 and sealed, the inner peripheral face 21 of the first tube member 10 is reduced in diameter, and pressed against the outer peripheral face 20 of the shaft member 1, thereby to frictionally couple the shaft member 1 and the tube member 2 to each other. A hatched region 80 in FIG. 5 shows a region where the inner face of the circumferentially extending chamber 38 intersects the oil pressure expanding chamber 26 in an extended plane extended toward the oil pressure expanding chamber 26 (in a strict sense, a region intersecting the oil pressure expanding chamber 26 out of an excursion in a strip-like shape which is drawn, when a closed curve which is a part of the inner face of the circumferentially extending chamber, 38 in contact with the oil pressure expanding chamber 26 is moved in the radial direction ("extension of the inner face" is used in this sense)), in a state where the shaft member 1 and the tube member 2 are frictionally coupled to each other, as described above.

An area of the region 80 where the inner face of the circumferentially extending chamber 38 intersects the oil pressure expanding chamber 26 in an extended plane extended toward the oil pressure expanding chamber 26 is larger than the area of the region 70 which is a sectional plane of the opening of the oil passage 37 opened to the circumferentially extending chamber 38 and defined by a part of the cylindrical face.

In the above described structure, in case where a load less than a determined value (the load in a range capable of transmitting torque) is exerted on the shaft member 1 or the tube member 2, the inner peripheral face 21 of the first tube member 10 is reduced in diameter with the oil pressure expanding oil which is filled into the oil pressure expanding chamber 26 and sealed, by way of a coupler (not shown), and the inner peripheral face 21 is pressed against the outer peripheral face 20 of the shaft member 1. In this manner, the shaft member 1 and the tube member 2 are frictionally coupled to each other, thereby to transmit the torque between the shaft member 1 and the tube member 2.

On the other hand, in case where a load more than the determined value (the load larger than the range capable of transmitting the torque) has been exerted on the shaft member 1 or the tube member 2, and a rotary position of the shaft member 1 with respect to the tube member 2 has changed, because the outer peripheral face 20 of the shaft member 1 has slipped with respect to the inner peripheral face of the first tube member 10, the locking part 9 cuts the one end portion of the shear valve 6 (an outward end of the tube 27 in the radial direction). As the results, the oil pressure expanding oil in the oil pressure expanding chamber 26 is discharged to the exterior through the shear valve 6 of which the one end portion has been cut. In this manner, a pressing force of the inner peripheral face 21 of the tube member 10 to be exerted on the outer peripheral face 20 of the shaft member 1 is lost, and the frictional coupling between the shaft member 1 and the tube member 2 is released thereby to interrupt transmission of the torque. In this manner, the transmission of the torque is interrupted, when an excessive load has been exerted on the shaft member 1 or the tube member 2, and thus, expensive machines coupled to the torque limiter are protected.

The inventor has conducted a number of tests, with trial and error, on the structure for rapidly removing the oil in the oil pressure expanding chamber, when the inner peripheral face of the tube member has slipped with respect to the outer peripheral face of the shaft member, using the torque limiters of various structures, and carried out thorough researches. As the results, it was found that in the conventional structure of the torque limiter, the time for removing the oil in the oil pressure expanding chamber cannot be remarkably shortened, only by increasing the number of the oil removing holes or by making the diameter of the oil removing hole larger, and such possibility that burn-out may occur on the frictionally engaged faces of the shaft member and the tube member cannot be remarkably reduced.

It was also found that in case where the circumferentially extending chamber which is extended in the circumferential direction is formed between the oil pressure expanding chamber and the oil removing hole, and the area of the region where the inner face of the circumferentially extending chamber intersects the oil pressure expanding chamber in the extended plane extended toward the oil pressure expanding chamber is made larger than the sectional area of the opening of the oil removing hole which is opened to the circumferentially extending chamber, the time for removing the oil in the oil pressure expanding chamber can be remarkably shortened, as compared with the conventional structure, and the time for removing the oil can be made abruptly rapid.

According to the torque limiter in the above described first embodiment, the area of the region 80 where the inner face of the circumferentially extending chamber 38 intersects the oil pressure expanding chamber 26 in the extended plane extended toward the oil pressure expanding chamber 26 is larger than the area of the region 70 which is a sectional plane of the opening of the oil removing hole to the circumferentially extending chamber 38 and defined by a part of the cylindrical face. Therefore, it is possible to remove the oil from the oil pressure expanding chamber 26 more rapidly, when the load more than the determined value has been exerted on the shaft member 1 or the tube member 2 and the inner peripheral face 21 of the tube member 2 has slipped with respect to the outer peripheral face 20 of the shaft member 1, and the time that the dynamic friction power is exerted between the shaft member 1 and the tube member 2 can be remarkably shortened. As the results, burn-outs on the respective frictionally engaged faces of the shaft member 1 and the tube member 2 can be restrained.

Moreover, according to the torque limiter in the above described first embodiment, the length of the circumferentially extending chamber 38 in the axial direction of the shaft member 1 is larger than the diameter of the oil passage 37. Therefore, as compared with the conventional structure, it is possible to remove the oil from the oil pressure expanding chamber 26 more rapidly, when the inner peripheral face of the tube member 2 has slipped with respect to the outer peripheral face of the shaft member 1.

Although the torque limiter in the above described first embodiment has the groove 35 for preventing the oil seal, it is possible to omit the groove for preventing the oil seal, according to this invention. Moreover, in the torque limiter in the first embodiment, the traction oil is sealed between the outer peripheral face 20 of the shaft member 1 and the inner peripheral face 21 of the tube member 2 which are frictionally engaged with each other. However, according to this invention, other lubricating oil than the traction oil, such as turbine oil may be sealed between the outer peripheral face of the shaft member and the inner peripheral face of the tube member which are frictionally engaged with each other.

Moreover, although in the torque limiter in the above described first embodiment, the circumferentially extending chamber 38 has a substantially rectangular sectional shape, the circumferentially extending chamber may have other shapes than the rectangular sectional shape, such as a triangular sectional shape, according to the invention. In this invention, the circumferentially extending chamber may have any shape, provided that the area of the region where the inner face of the circumferentially extending chamber intersects the oil pressure expanding chamber in the extended plane extended toward the oil pressure expanding chamber is larger than the sectional area of the opening of the oil removing hole opened to the circumferentially extending chamber. Further, in this invention, one or a plurality of shear tubes may be provided at equal intervals in the circumferential direction. Moreover, in this invention, a plurality of the shear tubes may be provided at unequal intervals in the circumferential direction.

In case where a plurality of the shear tubes are provided, it is possible to communicate a plurality of the shear tubes with the one oil passage 37, or it is also possible to provide the oil passages 37 respectively for the shear tubes. In case where a plurality of the oil passages 37 are provided, it is possible to provide the one circumferentially extending chamber 38 for the one oil passage 37, or it is also possible to provide the one circumferentially extending chamber 38 for a plurality of the oil passages 37. In case where the one circumferentially extending chamber 38 is provided for a plurality of the oil passages 37, it would be sufficient that the area of the region 80 where the inner face of the one circumferentially extending chamber 38 intersects the oil pressure expanding chamber 26 in the extended plane extended toward the oil pressure expanding chamber 26 is larger than a sum of areas of the regions 70 which are sectional planes of the openings of a plurality of the oil passages 37 to the one circumferentially extending chamber 38 and defined by a part of the cylindrical face.

In the torque limiter in the above described embodiment, the tube member 2 is composed of the first tube member 10 having the inner peripheral face 21 to be contacted with the outer peripheral face 20 of the shaft member 1, and the second tube member 11 having the oil pressure expanding chamber 26 in which the oil pressure expanding oil is sealed. However, in this invention, the tube member may be an integral tube member having the inner peripheral face to be contacted with the outer peripheral face of the shaft member, and the oil pressure expanding chamber in which the oil pressure expanding oil is sealed.

Although not particularly described, it would be, of course, preferable that the sectional area of the sectional plane of the circumferentially extending chamber communicated with the radially extending part, taken along a plane perpendicular to an extending direction of the oil passage as the radially extending part, is larger than the sectional area of the sectional plane of the radially extending part of the oil passage, irrespective of a distance between the sectional plane and a center axis of the shaft member. This is because the oil can be further rapidly removed, while the power is not transmitted.

Figure 6:
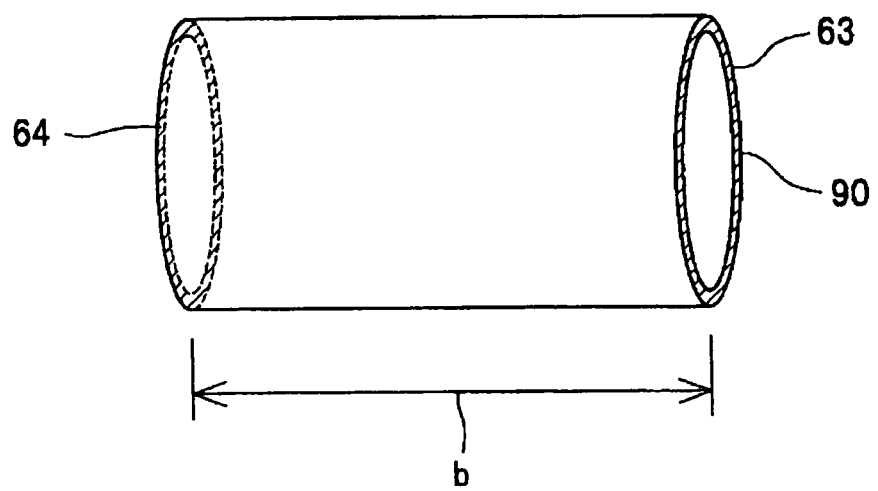
FIG. 6 is a view corresponding to FIG. 5, showing an essential part of a torque limiter in a second embodiment according to the invention.

FIG. 6 is a view corresponding to FIG. 5, showing a part of a torque limiter in a second embodiment of the invention.

The torque limiter in the second embodiment is different from the torque limiter in the first embodiment only in a shape of the circumferentially extending chamber, and the other structure except the circumferentially extending chamber is entirely the same as that of the torque limiter in the first embodiment.

Although not shown, the circumferentially extending chamber in the second embodiment is present along an entire circumference of the tube member. As shown in FIG. 6, in a state where the shaft member 1 and the tube member 2 are frictionally engaged with each other, by pressing the inner peripheral face 21 of the first tube member 10 which has been reduced in diameter against the outer peripheral face 20 of the shaft member 1, when the oil pressure expanding oil is filled in the oil pressure expanding chamber and then, sealed, a region 90 where the inner face of the circumferentially extending chamber intersects the oil pressure expanding chamber in an extended plane extended toward the oil pressure expanding chamber includes two parts 63 and 64 which are opposed to each other in the axial direction of the tube member and in parallel with each other. Each of the parts 63, 64 is formed by deducting, from an inner region of a first circle, an inner region of a second circle which has a same center as the first circle, exists on a same plane as the first circle, and has a smaller radius than the first circle. An area of the region 90 where the inner face of the circumferentially extending chamber having a sum of an area of the part 63 and an area of the part 64 intersects the oil pressure expanding chamber in an extended plane extended toward the oil pressure expanding chamber is larger than an area of a sectional plane of an opening of the oil passage 37, which is a part of the oil removing hole opened to the circumferentially extending chamber and defined by a part of the cylindrical face.

It is apparent that in each of the parts 63, 64, a length in the radial direction is equal to a difference between a thickness of the pressure oil expanding chamber in the radial direction, when the shaft member is frictionally engaged with the tube member, and a thickness of the oil pressure expanding chamber in the radial direction, while the oil is not filled in the oil pressure expanding chamber.

According to the torque limiter in the above described second embodiment, because the circumferentially extending chamber is a chamber in an annular shape, it is possible to increase the area of the region 90 where the inner face of the circumferentially extending chamber intersects the oil pressure expanding chamber in the extended plane extended toward the oil pressure expanding chamber, and it is also possible to equalize, in the circumferential direction, a sectional area of the oil in a flowing direction, when the oil flows into the oil removing hole. Therefore, as compared with the conventional structure, it is possible to abruptly rapidly remove the oil from the oil pressure expanding chamber, when the inner peripheral face of the tube member has slipped with respect to the outer peripheral face of the shaft member.

In the torque limiter in the above described second embodiment, the circumferentially extending chamber has a substantially rectangular sectional shape. However, according to the invention, the circumferentially extending chamber may have other shapes than the rectangular sectional shape, such as a triangular sectional shape. Moreover, in this invention, the circumferentially extending chamber may have any shape, provided that the area of the region 90 where the inner face of the circumferentially extending chamber intersects the oil pressure expanding chamber in the extended plane extended toward the oil pressure expanding chamber is larger than the sectional area of the opening of the oil passage opened to the circumferentially extending chamber. Further, in this invention, one or a plurality of shear tubes may be provided at equal intervals in the circumferential direction. Moreover, in this invention, a plurality of the shear tubes may be provided at unequal intervals in the circumferential direction. In case where a plurality of the oil passages are provided, it would be sufficient that the area of the region 90 where the inner face of the circumferentially extending chamber intersects the oil pressure expanding chamber in the extended plane extended toward the oil pressure expanding chamber is larger than a sum of areas of the regions which are sectional planes of the openings of a plurality of the oil passages opened to the circumferentially extending chamber and defined by a part of the cylindrical face.

Figure 7:
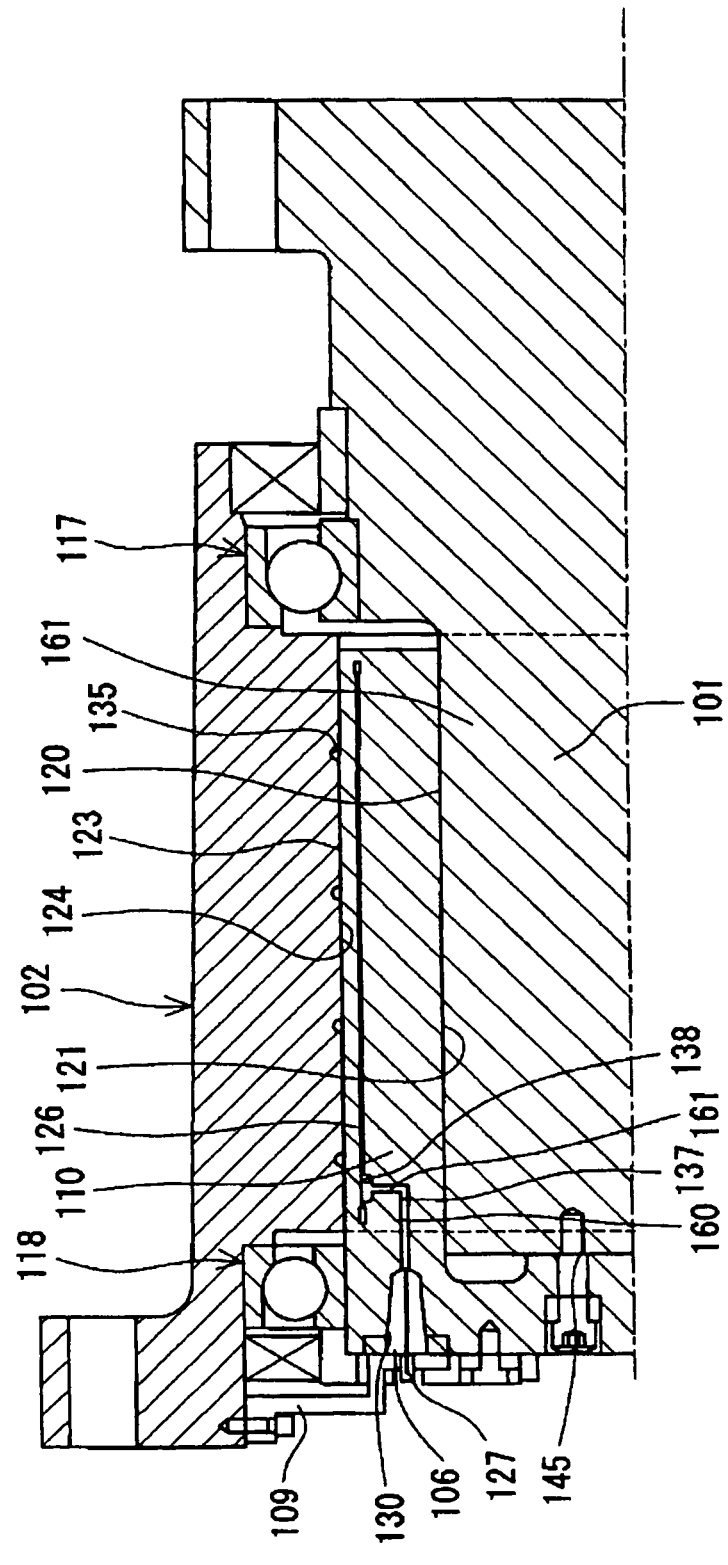
FIG. 7 is a sectional view of a torque limiter in a third embodiment according to the invention, taken along an axial direction.

FIG. 7 is a sectional view of a torque limiter in a third embodiment according to the invention, taken along an axial direction.

The torque limiter in the third embodiment is extensively different from the toque limiter in the first embodiment in that an oil pressure expanding chamber 126 in an annular shape is formed in a shaft member 101, and an outer peripheral face 123 of the shaft member 101 is frictionally engaged with an inner peripheral face 124 of a tube member 102, by expanding the oil pressure expanding chamber 126 in the radial direction.

In describing the torque limiter in the third embodiment, descriptions of the structure, operation, advantages and modifications which are common to those of the torque limiter in the first embodiment will be omitted.

The torque limiter in the third embodiment includes the shaft member 101, the tube member 102, a shear valve 106, a ball bearing 117, and a ball bearing 118.

The shaft member 101 includes a shaft body 161 having an outer peripheral face 120 in a substantially cylindrical shape, and an annular member 110. An inner peripheral face 121 of the annular member 110 is fitted to the outer peripheral face 120 of the shaft body 161, having its end face locked and fixed with a bolt 145. The annular member 110 has the outer peripheral face 123 in a substantially cylindrical shape.

The tube member 102 has a locking part 109 projecting from an outer face of the tube member 102, and the inner peripheral face 124 as a peripheral face. The inner peripheral face 124 of the tube member 102 has a groove 135 in a spiral shape for preventing oil seal which is similar to the one in the first embodiment. This groove 135 in the spiral shape is opened to both sides in the axial direction of a frictionally engaged part between the shaft member 101 and the tube member 102. A pitch of the groove 135 in the spiral shape is more than $1/1$ and less than $1/5$ of a shaft diameter (an outer diameter) of the shaft member 101.

The inner peripheral face 124 in a substantially cylindrical shape of the tube member 102 is adapted to be frictionally engaged with the outer peripheral face 123 of the shaft member 101 (specifically, the annular member 110), when the toque is transmitted. The traction oil or its mixture, which is lubricating oil for preventing burn-out in the same manner as in the first embodiment, is applied between the outer peripheral face 123 of the shaft member 101 and the inner peripheral face 124 of the tube member 102.

The annular member 110 has a shear valve fitting hole 130, and the oil pressure expanding chamber 126 in an annular shape which is extended in a substantially axial direction of the shaft member 101 along a determined length in the axial direction of the outer peripheral face 123 of the annular member 110.

The shear valve 106 is fitted into the shear valve fitting hole 130. In a state where the shear valve 106 is fitted into the shear valve fitting hole 130, one end portion of the shear valve 106 is projected outward in the axial direction from an end face of the annular member 110. The aforesaid locking part 109 is extended in the radial direction along the end face of the annular member 110. The one end portion of the shear valve 106 is locked by the locking part 109.

The shear valve 106 has a tube 127 which is open only at its one end. This tube 127 is extended in the substantially axial direction of the shaft member 101, in a state where the shear valve 106 is fitted into the shear valve fitting hole 130. In the state where the shear valve 106 is fitted into the shear valve fitting hole 130, the one end portion of the tube 127 at a closed side is projected outward from the end face of the annular member 110. Moreover, an opening of the tube 127 at an opposite side to the closed side is connected to the oil pressure expanding chamber 126 by way of an oil passage 137 and a circumferentially extending chamber 138.

As shown in FIG. 7, the oil passage 137 is composed of an axially extending part 160 and a radially extending part 161. The axially extending part 160 is communicated with the opening of the tube 127 at an inward side in the axial direction. the axially extending part 160 is extended in the axial direction. The radially extending part 161 is communicated with the opening of the axially extending part 160 at an opposite side to the tube 127 in the axial direction. The radially extending part 161 is extended in the radial direction. An opening of the radially extending part 161 at an outward side in the radial direction is open to an inner face of the circumferentially extending chamber 138 at an inward side in the radial direction. The tube 127 and the oil passage 137 constitute an oil removing hole.

The circumferentially extending chamber 138 is extended along an entire circumference in the circumferential direction. Moreover, in this invention, the circumferentially extending chamber may be extended only by a determined length in the circumferential direction, but need not be extended along the entire circumference, as described in the first embodiment.

By filling the oil pressure expanding oil into the oil pressure expanding chamber 126 and sealing it thereafter, the outer peripheral face 123 of the annular member 110 is enlarged in diameter, and pressed against the inner peripheral face 124 of the tube member 102, thereby to frictionally engage the shaft member 101 with the tube member 102. In this state, the area of the region where the inner face of the circumferentially extending chamber 138 intersects the oil pressure expanding chamber 126 in an extended plane extended toward the oil pressure expanding chamber 126 is larger than the area of the region which is a sectional plane of the opening of the radially extending part 161, which is a part of the oil removing hole, to the circumferentially extending chamber 138 and defined by a part of the cylindrical face. In the third embodiment too, the radially extending parts which are a part of a plurality of the oil removing holes may be open to the circumferentially extending chamber, as described in the first embodiment and the second embodiment. In case where the radially extending parts which are a part of a plurality of the oil removing holes are open to the circumferentially extending chamber, it would be sufficient that the area of the region where the inner face of the circumferentially extending chamber intersects the oil pressure expanding chamber 126 in the extended plane extended toward the oil pressure expanding chamber 26 is larger than a sum of areas of the openings of the radially extending parts which are a part of a plurality of the oil removing holes opened to the circumferentially extending chamber and defined by a part of the cylindrical face.

Because the torque limiter in the third embodiment too has the circumferentially extending chamber 138 having the above described structure, it is possible to remarkably rapidly remove the oil in the oil pressure expanding chamber 126, when the inner peripheral face of the tube member 102 has slipped with respect to the outer peripheral face of the shaft member 101, as compared with the conventional structure, in the same manner as in the first and second embodiments. As the results, such possibility that burn-outs may occur on the outer peripheral face 123 (the frictionally engaged face) of the shaft member 101 and the inner peripheral face 124 (the frictionally engaged face) of the tube member 102 can be abruptly decreased.

The invention claimed is:

1. A torque limiter comprising:
a shaft member; and
a tube member which is rotatably fitted over the shaft member, said tube member including:
an oil pressure expanding chamber for pressing an inner peripheral face of the tube member against an outer peripheral face of the shaft member;
a circumferentially extending chamber communicated with the oil pressure expanding chamber, projected outward from the oil pressure expanding chamber in a radial direction of the tube member, and extending in a circumferential direction of the tube member; and
an oil removing hole opened to the circumferentially extending chamber, and having a radially extending part which is extended outward in the radial direction from the circumferentially extending chamber,
wherein said oil removing hole is so constructed that when a load less than a determined value is exerted on the shaft member or the tube member, an end of the oil removing hole at an opposite side to the circumferentially extending chamber is sealed, whereby the oil pressure expanding chamber is inflated with the oil which is sealed in the oil pressure expanding chamber thereby to frictionally engage the shaft member and the tube member with each other, and when a load more than the determined value is exerted on the shaft member or the tube member, the end of the oil removing hole at the opposite side to the circumferentially extending chamber is opened to the exterior, whereby the oil in the oil pressure expanding chamber is removed thereby to release the frictional engagement between the shaft member and the tube member, and
wherein, while the oil pressure expanding chamber is inflated, an area of a region where an inner face of the circumferentially extending chamber intersects the oil pressure expanding chamber in an extended plane extended toward the oil pressure expanding chamber is larger than a sectional area of an opening of the oil removing hole which is opened to the circumferentially extending chamber.

2. A torque limiter as claimed in claim 1, wherein the circumferentially extending chamber is a chamber in an annular shape.

3. A torque limited as claimed in claim 1, wherein a length of the circumferentially extending chamber in an axial direction of the shaft member is larger than a diameter of the oil removing hole.

4. A torque limiter as claimed in claim 1, wherein the circumferentially extending chamber has a substantially rectangular shape in section in an axial direction, and is extended in an arc-like shape in section perpendicular to the axial direction.

5. A torque limiter as claimed in claim 1, wherein a tube and an oil passage constitute the oil removing hole, in which the oil passage forms the radially extending part of the oil removing hole.

6. A torque limiter as claimed in claim 1, further comprising a shear valve connected to the oil removing hole, an end portion of the shear valve projecting outward, in the radial direction, from an outer peripheral face of the tube member.

7. A torque limiter as claimed in claim 6, further comprising a locking part including an axially extending part which extends in an axial direction of the tube member along the outer peripheral face of the tube member so as to lock the end portion of the shear valve.

8. A torque limiter as claimed in claim 7, wherein the locking part further includes a radially extending portion opposed to an end face of the tube member.

9. A torque limiter as claimed in claim 1, wherein the tube member includes a first tube member abutting the outer peripheral face of the shaft member and a second tube member abutting an outer peripheral face of the first tube member.

10. A torque limiter as claimed in claim 9, wherein a rolling bearing is disposed between an inner peripheral surface of the second tube member and the shaft member.

11. A torque limiter as claimed in claim 1, wherein the outer peripheral face of the shaft member includes a groove formed in a spiral shape.

12. A torque limiter as claimed in claim 1, wherein an inner peripheral face of the tube member contacts the outer peripheral face of the shaft member.

13. A torque limiter as claimed in claim 12, wherein the inner peripheral face of the tube member has a substantially cylindrical shape.

\* \* \* \* \*